No. 880,272. PATENTED FEB. 25, 1908.
W. H. BRISTOL.
THERMO ELECTRICAL SYSTEM.
APPLICATION FILED NOV. 11, 1907.
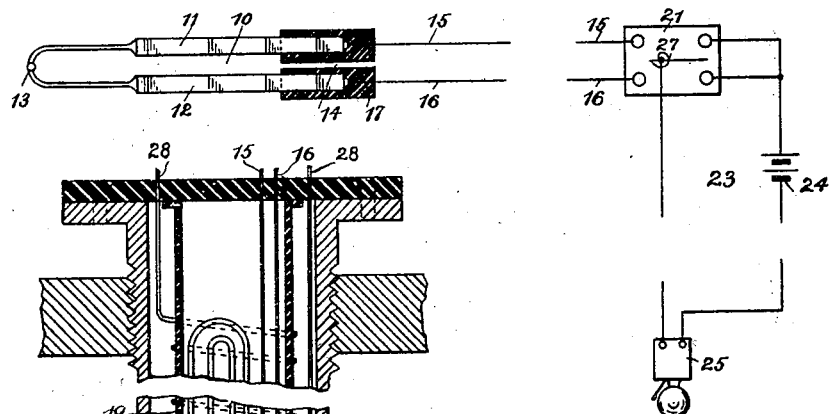
Fig. I.
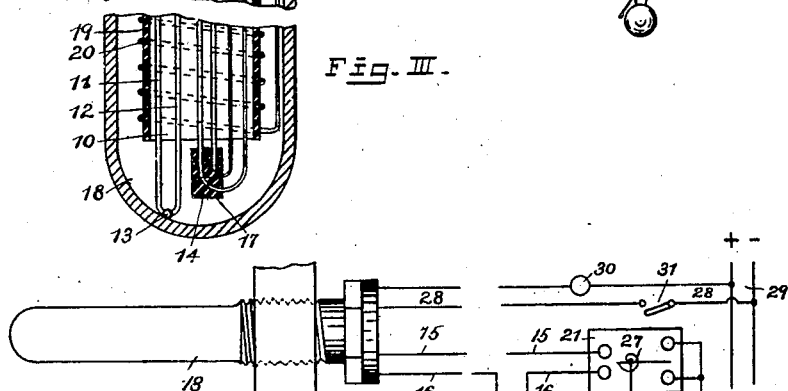
Fig. III.
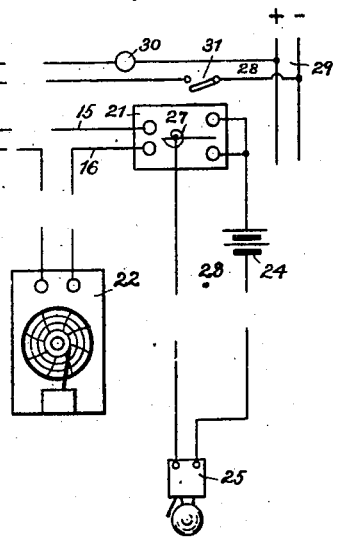
Fig. II.
Witnesses:
William H. Bristol, Inventor
By his Attorney

UNITED STATES PATENT OFFICE.

WILLIAM H. BRISTOL, OF NEW YORK, N. Y.

THERMO-ELECTRICAL SYSTEM.

No. 880,272.  Specification of Letters Patent.  Patented Feb. 25, 1908.

Application filed November 11, 1907. Serial No. 401,562.

*To all whom it may concern:*

Be it known that I, WILLIAM H. BRISTOL, a citizen of the United States, and a resident of New York, in the county of New York and State of New York, have invented certain new and useful Improvements in Thermo-Electrical Systems, of which the following is a specification.

My invention relates to indicating and recording systems, and particularly to a system affected by temperature changes; and it has for its object a system of this character adapted to respond to a sudden change of temperature, but not to a constant temperature or to a gradual change of temperature. I attain this object in the system set forth in the specification and illustrated in the accompanying drawings in which—

Figure 1 is a diagrammatic view illustrating the system. Fig. 2 is a similar view illustrating some additional features. Fig. 3 is a cross-sectional view on an enlarged scale of the member used in connection with the system illustrated in Fig. 2.

Similar characters of reference designate corresponding parts throughout the several views.

Referring to Fig. 1 of the drawings, 10 indicates a thermo-electric couple comprising two dissimilar and suitable elements 11 and 12, joined at the hot end 13 and attached at the cold end 14 to the leads 15 and 16 respectively. The hot end 13 is left bare; or is protected by some thermally conductive material as a mixture of powdered carborundum and a solution of sodium silicate, as disclosed in my prior patent No. 798,260 of August 29th, 1905. The cold end 14, however, must in all cases be thermally insulated to a certain degree, as by a winding of insulating tape, by gutta-percha or porcelain tube, or other similar material 17. The hot end 13 may also be of reduced cross-section, as shown, so as to more quickly assume the temperature of the medium to which it is exposed, as set forth in my prior patent No. 764,175 of July 5th, 1904. When required to respond to very small differences of temperature, a number of such couples (not shown) may be connected in series.

In Figs. 2 and 3 the couple 10 is shown inserted into a well 18; and in this event, the hot end 13 is preferably arranged to touch the inner wall of said well as shown in Fig. 3. The cold end 14 is placed in close proximity to the said hot end; but is arranged, however, so as not to touch the wall of the well 18, being thermally insulated as in the case of the couple shown in Fig. 1. An insulating casing or tube 19 is placed about the couple 10, and about the casing is wound a heating coil 20 of suitable resistance wire.

In both forms of couple, however, it is essential that the hot and cold ends of the couple be so located, that, when in action, they shall be acted upon by the same temperature existing in the medium.

As shown in Fig. 1 the leads 15, 16 connect to electrical apparatus, as the relay 21. In Fig. 2 I have shown a sensitive recorder 22, such as the smoked chart recorder disclosed in my prior patent No. 813,689 of February 27th, 1906 in series in the lead 16, the leads connecting also to a relay 21. If simply an indication be desired the recording device 22 may be replaced by the usual indicating milli-voltmeter or milli-ammeter (not shown); or if desired, both indicator and recorder may be included in circuit. Controlled by the relay 21, is a local indicating, alarm or signal circuit 23 comprising a source of electrical energy as the battery 24 and a suitable indicating device, signal or alarm as the bell 25. The arm 27 of the relay is balanced so as to be responsive to a current flowing in either direction, and will close the local circuit 23 in either event.

A test circuit 28, Fig. 2 is provided and comprises a source of electrical energy as the feeders 29, lamp 30, switch 31 and the heating coil 20 previously described. By closing switch 31 a current is sent through the coil 20 (as indicated by the lamp 30), and causes the same to heat the couple 10.

The operation of the system is as follows: It is well known that if the hot and cold end of a thermo-electric couple are at the same temperature, or if both ends are simultaneously exposed to the same temperature, no thermo-electric current is produced, as the setting up of an electro-motive force depends upon the existence of a difference of temperature between the two ends. If now, some means can be provided at one of the ends so that the other end will assume the temperature to which both are exposed more quickly than the former, a differential action takes place and there will exist a temporary difference of temperature at the two ends, and consequently a corresponding temporary electro-motive force will be set up. The couple therefore, if taken from one temperature after both ends are at the same temperature, and suddenly placed in a medium having a different temperature, will respond, even though both of the ends are in the medium and acted upon by the same temperature, since there is a lag in the case of one end in assuming the new temperature. If both ends, after an interval, then arrive at the same temperature, the couple no longer responds, and a gradual change will not produce any appreciable effect since the difference between the two ends is not sufficient. A sudden change however, will produce an appreciable effect due to the lag of one end in assuming the new temperature. This small electro-motive force set up is sufficient to operate the recording device 22, relay 21, etc., which relay in turn controls the local and more powerful circuit 23 adapted to operate various devices or signals. The test circuit 28 is employed to produce a sudden change of temperature at the couple, and thereby determine whether the operating circuit is intact. The recorder 22 will act as a check upon the testing as it will record the exact time when such test was made.

Numerous applications of this system will suggest themselves, one in particular will be mentioned—that of detecting, on board of a ship, the presence of icebergs. If the couple 10 be inserted in the well 18, which can be arranged in the plates of the ship so as to be under water, the couple will therefore be continuously exposed to substantially the temperature of the water.

So long as the temperature is constant, or, changing only gradually, no appreciable change in the relative temperature of the ends of the couple occurs. However, as soon as the ship arrives in the neighborhood of an iceberg the temperature suddenly and appreciably drops. This will cause the couple 10 to make a record, close the relay and thereby the alarm circuit, and give the necessary alarm. At every watch the test circuit may be closed to determine if operating circuit is intact.

I claim:—

1. A thermo-electric couple, adapted to set up a temporary electro-motive force when a sudden change of temperature occurs at the ends, both ends being in the same medium, but so arranged that one assumes the said temperature more quickly than the other.

2. A thermo-electric couple, having its ends in close proximity and adapted to set up a temporary electro-motive force when a sudden change of temperature occurs at said ends, one end assuming the said temperature more quickly than the other.

3. A thermo-electric couple, provided with means adapted to cause the same to set up a temporary electro-motive force, and only when both ends of said couple are simultaneously exposed to an appreciable and sudden change of temperature.

4. A thermo-electric couple, both ends of which are adapted to be simultaneously exposed to an appreciable and sudden change of temperature, but one of which is adapted to assume said temperature more rapidly than the other.

5. A thermo-electric couple, both ends of which are adapted to be simultaneously exposed to an appreciable and sudden change of temperature, but one of which is thermally insulated, whereby the other end assumes said temperature more rapidly than said thermally insulated end.

6. In an electrical system: electrical apparatus; and means in connection therewith adapted to affect said electrical apparatus when acted upon by a sudden change of temperature, but substantially inactive with respect to said electrical apparatus when acted upon by a constant temperature and by a gradual change of temperature.

7. In an electrical indicating system: an indicating device; and means in connection therewith adapted to affect said indicating device when acted upon by a sudden change of temperature, but substantially inactive with respect to said indicating device when acted upon by a constant temperature and by a gradual change of temperature.

8. In an electrical system: electrical apparatus; and means in connection therewith adapted to generate a temporary current of electricity when acted upon by a sudden change of temperature, but generating no appreciable current when acted upon by a constant temperature and by a gradual change of temperature.

9. In an electrical indicating system: an indicating device; and means in connection therewith adapted to generate a temporary current of electricity when acted upon by a sudden change of temperature, but generating no appreciable current when acted upon by a constant temperature and by a gradual change of temperature.

10. In an electrical system: electrical apparatus; and a thermo-electric couple in series therewith adapted to generate a temporary current of electricity when both ends are acted upon by a sudden change of temperature, but generating no appreciable current when acted upon by a constant temperature and by a gradual change of temperature.

11. In an electrical indicating system: an indicating device; and a thermo-electric couple in series therewith adapted to generate a temporary current of electricity when both ends are simultaneously acted upon by a sudden change of temperature, but generating no appreciable current when the same are acted upon by a constant temperature and by a gradual change of temperature.

12. In an electrical indicating system: an indicating device; and a thermo-electric couple in series therewith, one of whose ends is thermally insulated to such a degree that the said couple when acted upon by a sudden change of temperature will generate a temporary thermo-electric current, but when acted upon by a constant temperature and by a gradual change of temperature will not set up an appreciable thermo-electric current.

13. In an electrical indicating and recording system: an indicating device; means in connection therewith adapted to affect said indicating device when acted upon by a sudden change of temperature, but inactive with respect to said indicating device when acted upon by a constant temperature and by a gradual change of temperature; and means to record the effect of said means.

14. In an electrical system, a relay, and a local alarm circuit controlled thereby; and means in connection with said relay adapted to affect the same when acted upon by a sudden change of temperature, but inactive with respect to said relay when acted upon by a constant temperature and by a gradual change of temperature.

15. In an electrical system: a relay and a local alarm circuit controlled thereby; and a thermo-electric couple in series therewith adapted to affect the same when acted upon by a sudden change of temperature, but inactive thereto when acted upon by a constant temperature and by a gradual change of temperature.

16. In an electrical system: a relay and a local alarm circuit controlled thereby; and a thermo-electric couple in series therewith, one of whose ends is thermally insulated to such a degree, that the said couple when acted upon by a sudden change of temperature will generate a temporary thermo-electric current, but when acted upon by a constant temperature and by a gradual change of temperature will not set up an appreciable thermo-electric current.

17. In an electrical system: a relay and a local alarm circuit controlled thereby; a thermo-electric couple in series therewith, one of whose ends is thermally insulated to such a degree, that the said couple when acted upon by a sudden change of temperature will generate a temporary thermo-electric current, but when acted upon by a constant temperature and by a gradual change of temperature will not set up an appreciable thermo-electric current; and means to record said thermo-electric current.

18. In a system of the character specified: a well adapted to be subjected to temperature variations; and a thermo-electric couple therein, the hot end of which is in contact with the wall of said well, and the cold end thermally and electrically insulated therefrom.

19. In a system of the character specified: a well adapted to be subjected to temperature variations; a thermo-electric couple therein, the hot end of which is in contact with the wall of said well, and the cold end thermally and electrically insulated therefrom; and a heating coil about said couple for the purpose specified.

Signed at New York in the county of New York and State of New York this 8th day of November A. D. 1907.

WILLIAM H. BRISTOL.

Witnesses:
  GEORGE A. MINASIAN,
  FRED'K F. SCHUETZ.